United States Patent [19]

Widger

[11] Patent Number: 5,371,538
[45] Date of Patent: Dec. 6, 1994

[54] METHOD FOR ADJUSTING THE PEDESTAL OF AN ELECTRONIC IMAGING SYSTEM

[75] Inventor: Nancy J. Widger, Rochester, N.Y.

[73] Assignee: Eastman Kodak Company, Rochester, N.Y.

[21] Appl. No.: 922,640

[22] Filed: Jul. 30, 1992

[51] Int. Cl.$^5$ ............................................ H04N 17/00
[52] U.S. Cl. ................................. 348/188; 348/176; 348/693
[58] Field of Search .................. 358/10, 139, 225, 209; 354/20; 382/50, 54; 348/187, 188, 175, 176, 693; 356/243, 390, 421, 431, 230

[56] References Cited

U.S. PATENT DOCUMENTS

| | | | |
|---|---|---|---|
| 2,742,525 | 4/1956 | Larky et al. | 358/10 |
| 3,357,230 | 12/1967 | Topaz | 348/188 |
| 3,413,066 | 11/1969 | Biber et al. | 356/243 |
| 4,326,219 | 4/1982 | Griesshaber | |
| 4,513,318 | 4/1985 | Wilensky et al. | 358/10 |
| 4,575,124 | 3/1986 | Morrison | |
| 4,631,691 | 12/1986 | Pica | 358/10 |
| 4,760,447 | 7/1988 | Koka et al. | |
| 4,779,136 | 10/1988 | Corley | 358/139 |
| 5,033,015 | 7/1991 | Zwirn | |
| 5,089,740 | 2/1992 | Ono | |
| 5,148,026 | 9/1992 | Watanabe et al. | |

OTHER PUBLICATIONS

Japanese Journal of Applied Physics, vol. 26, (1987), pp. 198–200, K. Nakamura, et al., "Bending Vibrator Consisting of a . . . ".

Japanese Journal of Applied Physics, vol. 30, No. 3A, Mar. 1991, pp. L 405–L 406, S. Ikebe, et al., "Use of a ReO$_3$ Single Crystal as the Tip . . . ".

*Primary Examiner*—Stephen Chin
*Assistant Examiner*—Timothy J. May
*Attorney, Agent, or Firm*—Nixon, Hargrave, Devans & Doyle

[57] ABSTRACT

A quality assurance standard for a video composite image has a target 10 with indicia 30 and a moveable flap 18 for casting a shadow 15 onto the indicia 30 in order to control the pedestal of an image captured by a video camera 2.

7 Claims, 3 Drawing Sheets

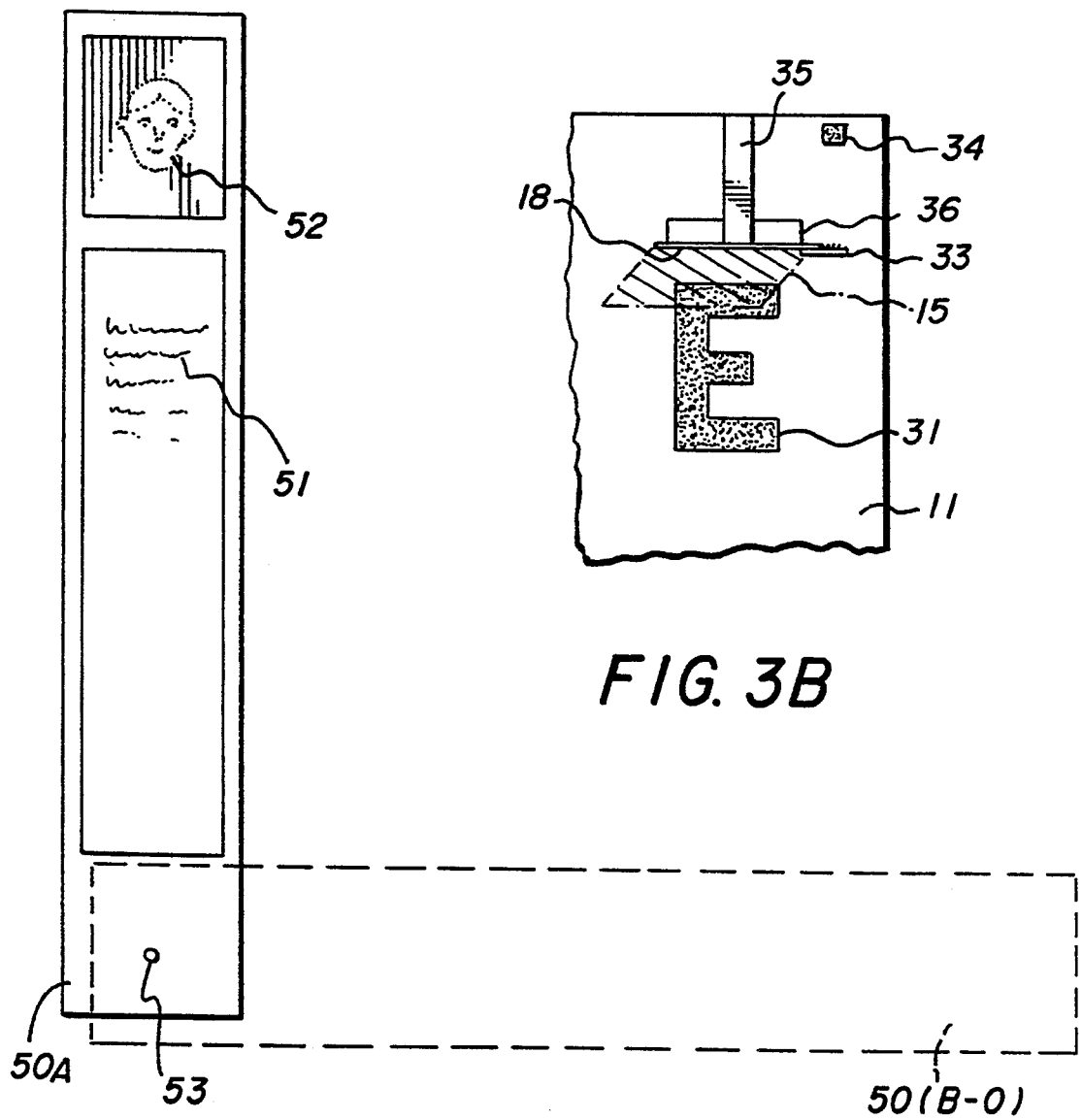

METHOD FOR ADJUSTING THE PEDESTAL OF AN ELECTRONIC IMAGING SYSTEM

BACKGROUND

This invention relates to electronic imaging systems, and, in particular, to an apparatus and method for quality assurance of images produced by such systems.

Electronic imaging systems are particularly versatile for producing special effect images. One such system, the Image Magic (TM) system of Eastman Kodak Company, enables a user to superimpose one image taken by a camera over another, stored, electronic video image. For example, such systems are particularly useful at public attractions where a person can have his own image superimposed on a background image identified with the attraction. An individual then stands in a studio in front of a solid color background and an electronic image of the individual is taken. A control unit for the system merges the image of the individual onto the stored, background image. The result is a composite image in which the individual appears to be standing in front of the background.

A particular problem encountered with such merged electronic images is shadows, particularly shadows cast by a person's face and other body parts. Such shadows can materially effect the quality of an image. The video characteristic associated with accurate shadow reproduction is known as pedestal. Pedestal is a video variable that controls the image quality of shadows. In particular, it controls the relationship of white, black and shadow to see that each one is distinguishable from the others. The pedestal is normally adjusted by the Operator of a video camera.

The quality of a shadow cast by a chin onto a person's neck is difficult to objectively evaluate. In one case, the chin shadow may be too dark and look like a beard. In another case, the chin shadow may be too light and so the jaw of the person's face lacks depth. Present systems rely on the operator's subjective judgment of what is an acceptable pedestal.

In addition to the problem of pedestal adjustment, electronic imaging systems also require quality standards for exposure, focus, color, gamma, and linear matrix. Pedestal, gamma, and linear matrix are parameters that are characteristic of video systems. While pedestal refers to shadows or black images, gamma refers to the darkness of the overall target. Thus, with too much gamma, the image appears very saturated and the colors and blacks are too deep. An incorrect linear matrix results in an image where the colors appear slightly washed out. As such, the image has too light an appearance.

Until now there has been no quality standard for assuring the pedestal, gamma, and linear matrix characteristics of images, in particular, composite electronic images.

SUMMARY

The invention provides a method and apparatus for assuring the quality of composite electronic images. The apparatus includes a target having a surface with certain indicia mounted on the surface of the target. The indicia are mounted on a neutral background, preferably gray. In the preferred embodiment the indicia comprise a series of letters including a large letter "E" of a Snellen eye chart. Such eye charts comprise black indicia printed on a white surface. The target has an opaque flap capable of being disposed at an angle to the surface and to extend into the path of light striking the indicia. In particular, the flap is operable to extend from the surface of the target at an angle of about 90° to the target surface. As such, the flap will cast a shadow over the upper leg of the E and onto the white surface of the chart that surrounds the E.

In the preferred method, a shadow is cast upon the upper leg of the E and onto the background adjacent the upper leg. A camera takes an electronic image of the target and a print of the target image is made. If the shadow is indistinguishable from the upper leg of the E (i.e., too dark), then the pedestal setting needs to be increased. Likewise, if the shadow appears too light on the printed image, the pedestal should be reduced.

The invention also provides at least two other areas on the target. One area comprises a life size image of a human face, preferably from the crown to the chin of the human face. The target also provides a color rendition chart with a number of colored squares and a gray scale, preferably at least six steps between black and white.

Still another aspect of the invention comprises a plurality of paddles. Each paddle extends longitudinally. At one end of the paddle there is an image. Intermediate the two ends are indicia describing the image and indicating what corrective action if any is to be taken if aspects of the image shown on the end of the paddle correspond to aspects of a test image generated by the electronic imaging systems. At the other end of the paddle is a pin, rivet, or other suitable means for connecting the paddle to other paddles. In the preferred embodiment there are fifteen individual paddles, each separately describing a normal image or problem images and various corrective actions that may be undertaken to correct the problems shown in the problem images.

BRIEF DESCRIPTION OF THE DRAWINGS

FIGS. 3a and 3b are partial broken away views showing the inventive flap extending over a portion of the target;

FIG. 4 is a view showing the paddle of the invention.

DETAILED DESCRIPTION

Figure 1:
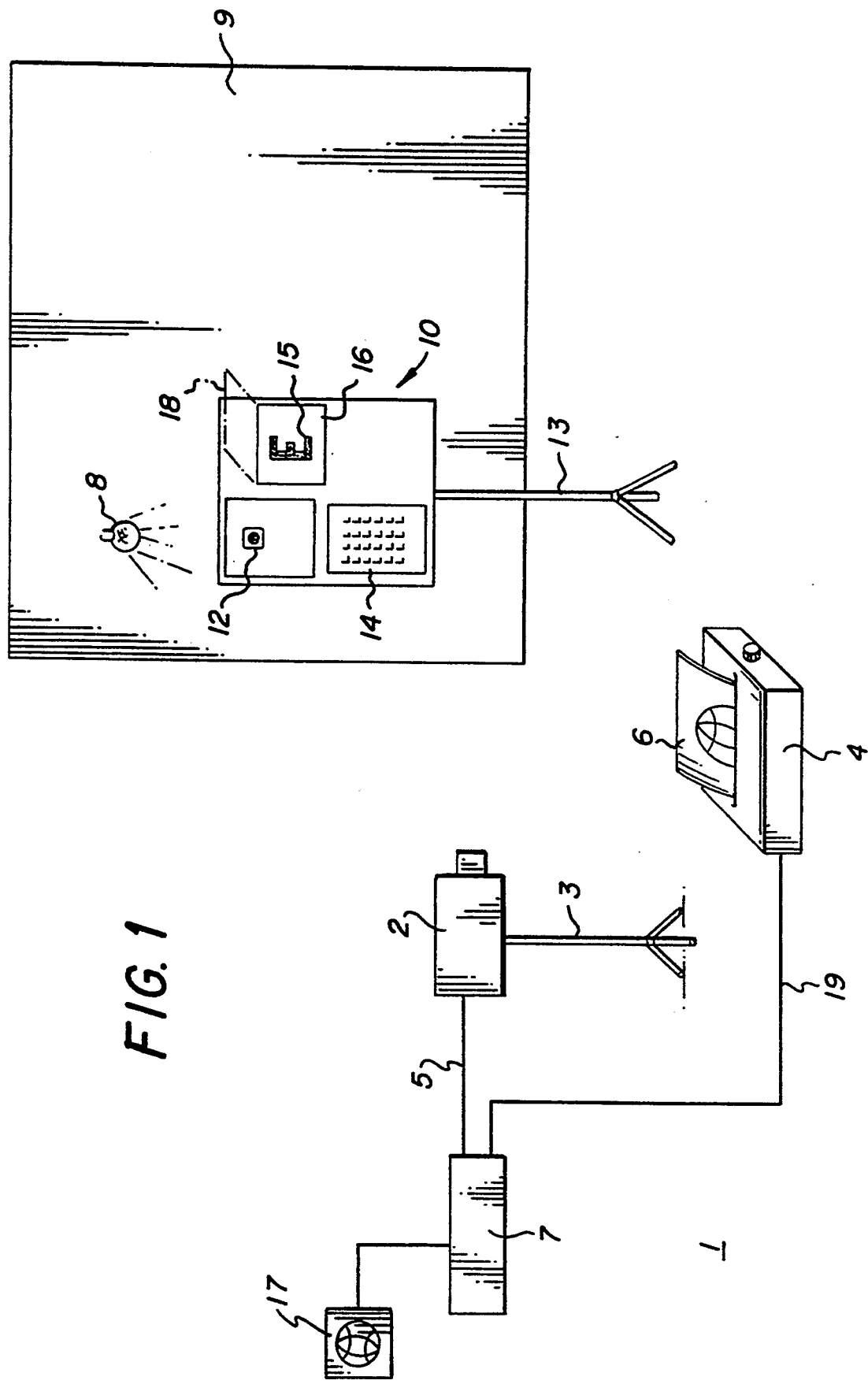
FIG. 1 is an overall view of an electronic imaging system including the target of the invention.

Turning to FIG. 1 there is generally shown an electronic video imaging system 1. Imaging system 1 includes a camera 2 under control of a control unit 7. The control unit 7 is capable of receiving and/or storing an image of a background 17, such as a globe. Camera 2 is supported on a tripod 3. Camera 2 is any suitable video camera such as ridicon or a charge coupled device camera. Camera 2 is focused to capture an image of a target 10. The image captured by camera 2 is converted into electronic signals that are outputted via output line 5 to control unit 7. Control unit 7 is operable to generate separate electronic signals representative of the target 10, the background 17 or a composite image 6 of the target 10 superimposed on the background 17. An electronic signal of the desired image is transmitted via output line 19 to a printer 4. Printer 4 is preferably a thermal type dye transfer printer. As can be seen in FIG. 1, the output of printer 4 is a print 6 that bears a superimposed image on the background 17.

The image captured by camera 2 is an image of a target 10. Target 10 is supported by a tripod 13. Target 10 generally has a planar surface and includes three areas 12, 14, 16, each area bearing distinctive information. The target 10 is illuminated by a light source 8. The light source 8 may include one or more lamps.

In the preferred embodiment light source 8 comprises six lights including two Lowel soft lights each of 1000 watts disposed on the plane of the camera on opposite sides of the center at approximately three to four feet above the camera and aimed at the target 10. Two 750 watt Lowel DP lights are disposed near the plane of the target 10, two feet on each side of center approximately eight to nine feet above the floor and aimed at the background 9. Two other Lowel DP 750 watt lights are disposed about a foot in front of the background 9, two feet on each side of the center and approximately eight to nine feet above the floor and aimed at the target 10.

Background 9 is a solid wall painted a suitable color. In the preferred embodiment the color is green. In the final superimposed image, the background green will be removed from the image of the target 10 by control unit 7.

The camera 2 is disposed 103 inches from the front of the target 10 and 54.5 inches above the floor, as measured from the floor to the center of the lens. The focal length of the lens of the chosen camera is 17 mm on its zoom setting. The image of the target 10 is preferably taken at an angle or 10° with respect to the normal between the camera 2 and the target 10. Such an angle reduces glare from the target 10. The printer 4 is a Kodak model XL7700 that uses print media adapted for thermal dye transfer image forming.

Figure 2:
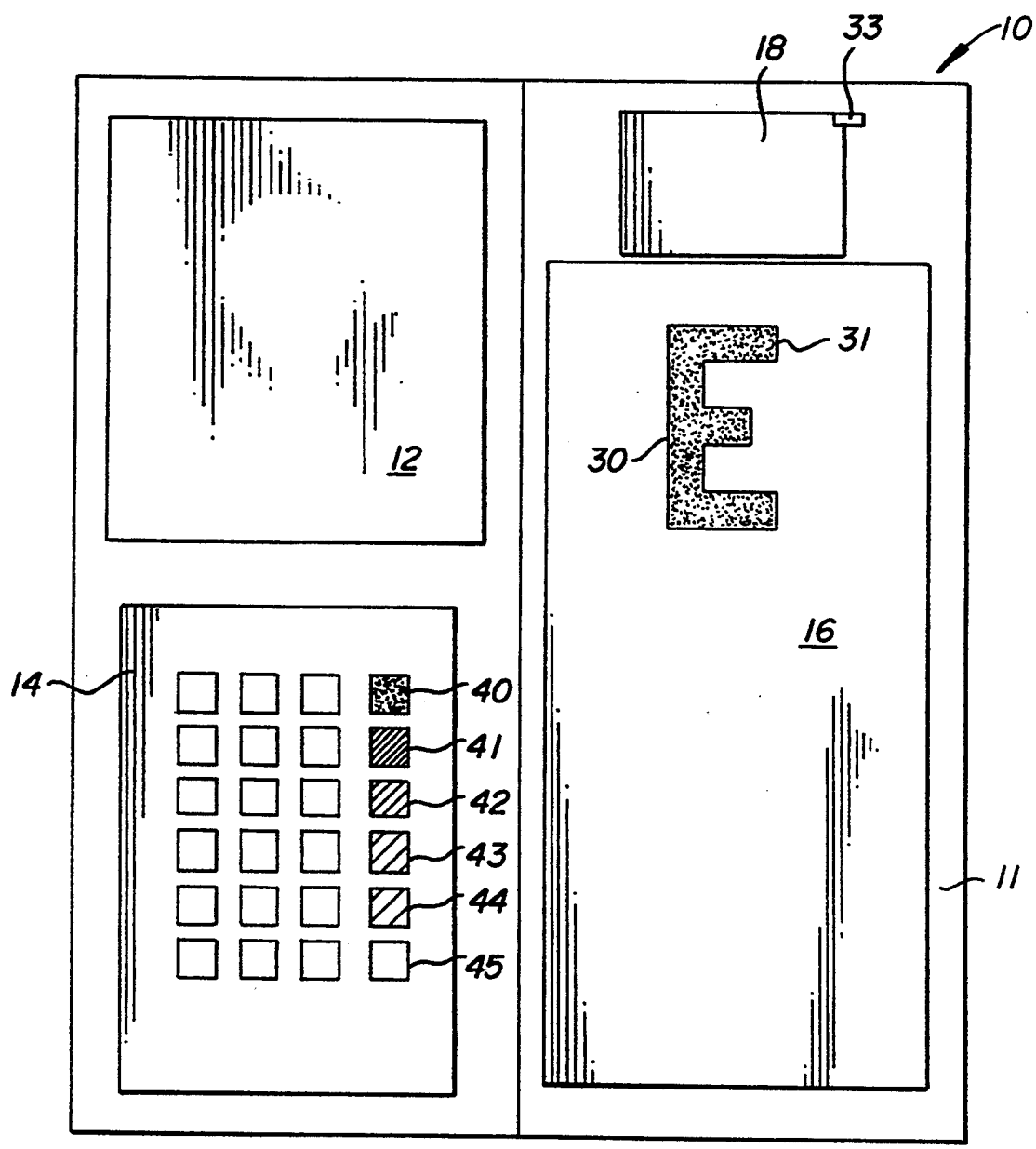
FIG. 2 is a front view of the target of the invention.

The target 10 is more particularly shown in FIG. 2. Target 10 comprises a support board 11 that is generally rectangular in shape and has a front surface with three distinctive image areas, 12, 14 and 16. Image area 12 comprises a portrait of a human aspect, in particular, the face of human being from the crown of the person's head to the chin. Area 14 includes a color rendition chart comprising a number of colored squares, known as a Macbeth ® Color Checker ®. The color chart 14 includes squares of different colors, and has a column of squares 40-45 that vary in a gray intensity from a black square 40 to a white square 45. The other color squares have colors typical of natural objects.

On the right hand side of target 10 there is a Snellen eye chart 16. The Snellen eye chart 16 bears numerous indicia printed on a white background. At the top of the eye chart 16 is a large letter "E" 30 having an upper leg 31 extending horizontally across the eye chart 16.

Disposed above eye chart 16 is a flap 18. The flap 18 is of suitable size to cast a shadow 15 (FIG. 3b) on the top leg 31 of the letter E 30 and its surrounding, white background. In the preferred embodiment flap 18 is approximately 6 inches by 4 inches in size and is made of 1/16th inch gray polyvinyl chloride. One side of the flap has a textured surface in order to reduce glare. The textured surface is on the bottom side of the flap 18 when the flap is disposed at an angle to the surface of target 10.

Flap 18 is connected to target 11 as shown more particularly in FIGS. 3a and 3b. A plastic hinge 36, preferably having one adhesive surface, extends along the edge of flap 18 to moveably couple the flap 18 to the support board 11. A retaining ribbon 35 of suitable length is attached at one end to the edge of flap 18 opposite hinge 36 and at its other end to support board 11. Ribbon 35 is long enough to allow the flap 18 to open and extend at about a 90° angle to support board 11. Flap 18 is held in its retracted position against support board 11 by cloth fasteners 33, 34, such as velcro fasteners. In the preferred embodiment, the flap is held in its extended position by hinge 36 and ribbon 35 and is thus disposed at about a 90° angle to the target surface. By disposing the flap at about a 90° angle to the surface of target 11, a shadow 15 is cast upon the upper leg 31 of the letter E 30 as well as the background surrounding the letter E 30 and its upper leg 31.

In operation, the target 10 is suitably positioned with respect to camera 2 and illuminated by a light source 8. The flap 18 is disposed at about a 90° angle to the chart 16 so that a shadow 15 is suitably cast on the upper leg 31 of the letter E 30. The camera receives an image of the target 10 and transmits that image via line 5 to control unit 7. Control unit 7 superimposes the image of target 10 onto stored image 17. An electronic signal representative of the superimposed image is transmitted via line 19 to printer 4. Printer 4 outputs a printed copy 6 of an image of target 10 superimposed on background image 17. The control unit 7 is operable to delete the background 9 of target 10 by simply subtracting the color of background 9 from the image of target 10. Alternatively, control unit 7 may simply output a signal representative of only the target 10.

An operator may then inspect the print 6 and make suitable adjustments to pedestal if adjustments are required. For example, if the shadow 15 is too dark and indistinguishable in blackness from the upper leg 31 of the letter E 30, then the pedestal must be increased to generate a lighter shadow. On the other hand, if the shadow is too light then the pedestal needs to be reduced to generate a darker shadow in a printed image 6.

As mentioned above, area 16 is generally a Snellen eye chart and it represents both a variety of letter sizes and a relatively large area of white background. Area 14 includes a Macbeth ® Color Checker ®. This area generally includes twenty-four squares representing a typical variety of eighteen colors and a six step gray scale ranging from white to black. Area 12 includes a life size image of a human face from the crown to the chin. The image is approximately 9 inches long and should be suitably chosen to represent desired variations in skin types and hair colors. The target 11 is generally made of a folding board of approximately ⅛ inch thick, gray colored, expanded polyvinyl chloride or any other light weight durable plastic material.

The results of the printed image 6 may be compared to one of a plurality of paddles 50 (A-O) as shown in FIG. 4. Paddles 50 (A-O) provide standards for measuring focus, exposure, pedestal, gamma, and linear matrix. Each paddle 50 comprises an elongated member having at one end an image 52. The image 52 comprises the target image 10. The intermediate portion of a paddle 50 carries indicia 51 including words that are descriptive of the image 52 appearing at the end of paddle 50. The words 51 are instructions for adjusting the control unit 7 in the event that the printed image 6 has a problem characteristics similar to the image 52 shown on the paddle 50. Different paddles are used to exhibit different problems of focus, exposure, pedestal, color, gamma, and linear matrix and each has its own image 52 and its own corrective indicia 51. When the problem indicated in the image 52 of a paddle corresponds to the problem indicated in a print 6, the operator then follows the description given on the paddle in the portion 51 to adjust the color control unit 7 to eliminate the problem.

A number of paddles, fifteen in all, are provided to show a normal image and illustrate the potential range of problems that can be experienced. These paddles are coupled together by a coupling means 53 such as a rivet, pin, or other coupling means that permits the rotation of the paddles about the coupling means 53. An operator compares a printed image 6 of the target 10 to the image 52 on the paddles. If corrective action is required, the operator makes the correction according to the instructions 51 on the paddle whose image 52 most closely corresponds to the printed image 6. If more than one problem is discovered, it is preferable that the operator correct one problem at a time, preferably correcting the worst problem first and retransmitting a corrected image. This process is repeated until the printed image 6 corresponds to the image 52 shown on the normal paddle. Appendix A includes the indicia for each of the paddles 50 (A–O).

Those skilled in the art will appreciate that various changes and modifications may be made to the preferred embodiment without departing from the spirit and scope of the following claims. For example, lights of different intensity and placement may be used. If placement or intensity are varied, some adjustment may be required for camera 2 or in the size and angle of the flap 18. For example, if one light of the preferred embodiment is off, the exposure may require a half step adjustment.

Also, the support board 10 may have a hinge extending vertically between its upper and lower ends. The indicia bearing areas 11, 12, 14 can be folded, one on top of the other, for ease of storage and to prevent damage from unwanted handling and excess exposure to light after the user is finished with the target 10.

Appendix A.

| Paddle A | |
|---|---|
| "NORMAL" | |
| Image should | |
| be like this | |
| Procedure: | |
| 1. Compare the print (in 5 × 7 area) to "NORMAL" above (note: image is slightly angled to avoid glare) | |
| 2. If print does not match "NORMAL" then check examples in appropriate category: "DARK" "LIGHT" "MISSING" "BLURRY" "COLOR" | |
| 3. For more than one problem, correct the worst first, receive new image, then follow steps 1 through 3 again | |
| IMPORTANT: | |
| Always make sure exposure setting on camera lens is OK before trying other corrections | |

| Paddle B | Paddle C |
|---|---|
| "DARK" | "DARK" |
| Underexposed | Underexposed |
| ½ f/stop | 1 f/stop |
| Looks: | Looks: |
| Too Dark | Too Dark |
| Where: | Where: |
| Over-all | Over-all |
| Note: | Note: |
| 1. Bottom half of eye chart looks gray | 1. Whole eye chart looks gray |
| 2. White square starts to look gray | 2. White square looks gray |
| Problem Shown: | Problem Shown: |
| Camera lens opening set ½ f/stop under | Camera lens opening set 1 f/stop under |
| (Lens opening too small - f1 setting on lens too large) | (Lens opening too small - f1 setting on lens too large) |
| -OR- | -OR- |
| One light may be off or burned out | 2 lights may be off or burned out |
| Suggest: | Suggest: |
| Check f/ setting on camera lens | Check f/ setting on camera lens |
| Check lights | Check lights |
| If Still DARK: | If Still DARK: |
| Refer to other "DARK" Standards | Refer to other "DARK" Standards |

| Paddle D | Paddle E |
|---|---|
| "DARK" | "DARK" |
| Pedestal set too low | Gamma off |
| Looks: | Looks: |
| Too Dark | Too Dark |
| Where: | Where: |
| 1. Shadow on large "E" - as dark as "E" | Over-all |
| 2. Border on color chart - as black as black square | Note: Whole target appears very saturated - colors and blacks too deep |
| Note: Eye chart and white square still look white | Problem Shown: Gamma switch shut off |
| Problem Shown: Ped. set ½ increment too low ("Increment" = distance below markings around the dial) | Suggest: Check Gamma switch on back of camera control unit (should always be in ON position) |
| Suggest: Check Ped. setting on carmera control unit | If still DARK: Refer to other "DARK" Standards |
| If Still DARK: Refer to other "DARK" Standards | |

| Paddle F | Paddle G |
|---|---|
| "LIGHT" | "LIGHT" |
| Overexposed | Overexposed |
| ½ f/stop | 1 f/stop |
| Looks: | Looks: |
| Too Light | Too light |
| Where: | Where: |
| Over-all (but look at gray scale) | Over-all (but look at gray scale) |
| Note: | Note: |
| 1. Bottom 2 squares on gray scale both look white | 1. Bottom 3 squares on gray scale all look white |
| 2. Lower lines of eye chart begin to "disappear" (line 9 on) | 2. Lower lines of eye chart begin to "disappear" (line 7 on) |
| Problem Shown: | Problem Shown: |
| Camera lens opening set ½ f/stop over | Camera lens opening set 1 f/stop over |
| (Lens opening too big - f1 setting on lens too small) | (Lens opening too big - f1 setting on lens too small) |
| Suggest: | Suggest: |
| Check f/ setting on camera lens | Check f/ setting on camera lens |

Appendix A.-continued

| Paddle H | Paddle I |
|---|---|
| If Still LIGHT: Refer to other "LIGHT" Standards | If Still LIGHT: Refer to other "LIGHT" Standards |
| "LIGHT" Pedestal set too high Looks: Too light Where: 1. Shadow on large "E" - too light 2. Black square on color chart - almost as light as border Note: 1. Eye chart still has all lines (none "disappeared") 2. 1st gray square next to white looks gray Problem Shown: Ped. set ½ increment too high ("Increment" = distance below markings around the dial) Suggest Check Ped. setting on camera control unit If Still LIGHT: Refer to other "LIGHT" Standards | "LIGHT" Linear Matrix Off Looks: Too light Where: Over-all Note: Whole target appears very slightly washed out (problem is difficult to detect, but may need to check switch if no other cause is found) Problem Shown: Linear Matrix switch shutoff Suggest: Check Linear Matrix switch on back of camera control unit (should always be in ON position) If still LIGHT: Refer to other "LIGHT" Standards |

| Paddle J | Paddle K |
|---|---|
| "MISSING" Underexposed 2+ f/stops (extreme) Looks: Like parts of image missing Where: Over-all Note: Eye chart and gray board have "missing" areas and remaining areas are dark Problem Shown: Camera lens opening set more than 2 f/stops under (Lens opening too small - f1 setting on lens too large) -OR- Lights may be off or burned out Suggest: Check f/ setting on camera lens Check lights If Still MISSING: Ck. settings on camera control unit (Iris should be on MAN) | "MISSING" Overexposed 2+ f/stops (extreme) Looks: Like parts of image missing Where: Over-all Note: Eye chart and gray board have "missing" areas and remaining areas are light Problem Shown: Camera lens opening set more than 2 f/stops over (Lens opening too big - f1 setting on lens too small) Suggest: Check f/ setting on camera lens If Still MISSING: Ck. settings on camera control unit (Iris should be on MAN) |

| Paddle L | Paddle M |
|---|---|
| "BLURRY" Focused near (extreme) Looks: Very "Fuzzy" (unsharp) Where: Over-all Note: Focus set much too near is bigger problem than focus set much too far Problem Shown: Focus set at much shorter dist. than actual dist. (set at 3½ feet) Suggest: Check focus ring setting on camera lens (should be near 8½ feet) If Still BLURRY: Refer to other "BLURRY" Standard | "BLURRY" Focused far (extreme) Looks: Slightly "Fuzzy" (unsharp) Where: Over-all Note: Focus set much too far is lesser problem than focus set much too near Problem Shown: Focus set at much greater dist. than actual dist. (set at infinity) Suggest: Check focus ring setting on camera lens (should be near 8½ feet) If Still BLURRY: Refer to other "BLURRY" Standard |

| Paddle N | Paddle O |
|---|---|
| "COLOR" Color Temp. set too high Looks: Very Yellow/Red (warm) Where: Over-all Note: 1. Eye chart and white patch look yellow/red 2. Gray target background looks tan Problem Shown: Color Temp. switch set at 5600K Suggest: Check Color Temp. switch on camera control unit (should be at 3200K) If Still COLOR: Refer to other "COLOR" Standard Also check exposure setting on camera lens | "COLOR" Color Balance Looks: Different color from "Normal" sample Where: Over-all Note: Color could be off in any direction: red, yellow, green, cyan, blue, magenta Problem: White balance procedure may not have been followed -OR- Other light source may be present in studio Suggest: Re-do while balance following exact procedure (white, black, while) Check for unwanted light source If Still COLOR: Refer to other "COLOR" Standard Also check exposure setting on camera lens |

I claim:

1. A method for adjusting the pedestal of an electronic imaging system comprising the steps of:
    providing a target having a solid planar front surface bearing indicia on a contrasting background,
    directing light toward the front surface of said target,
    opaquely interfering with said light to generate a shadow on at least part of the indicia and part of the background and no shadow on the remainder of the indicia and background to create a partially shadowed test image;
    adjusting the pedestal of the electronic imaging system so that within an image of said target captured by the electronic imaging system, the part of the background in shadow is distinguishable from the indicia.

2. The method of claim 1 wherein the indicia are black and the contrasting background is white.

3. The method of claim 1 further comprising extending a planar, opaque surface between the light and the planar front surface in order to cast the shadow on the indicia and the background.

4. The method of claim 1 further comprising providing an image of a human face on said surface of said target.

5. The method of claim 1 wherein the front surface has a chart with a plurality of colors.

6. The method of claim 5 wherein said chart comprises a gray scale.

7. The method of claim 1 further comprising the steps of converting the partially shadowed test image into a first plurality of signals representative of said partially shadowed test image;

converting a second image into a second plurality of electrical signals representative of said second image;

combining said first and second plurality of signals to create a composite signal;

converting said composite signal into a composite image of the first partially shadowed test image and the second image.

* * * * *